(12) United States Patent
Zhang

(10) Patent No.: US 11,748,164 B2
(45) Date of Patent: Sep. 5, 2023

(54) FAAS DISTRIBUTED COMPUTING METHOD AND APPARATUS

(71) Applicant: INSPUR SUZHOU INTELLIGENT TECHNOLOGY CO., LTD., Jiangsu (CN)

(72) Inventor: Yao Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/792,252

(22) PCT Filed: Aug. 26, 2020

(86) PCT No.: PCT/CN2020/111394
§ 371 (c)(1),
(2) Date: Jul. 12, 2022

(87) PCT Pub. No.: WO2021/139174
PCT Pub. Date: Jul. 15, 2021

(65) Prior Publication Data
US 2023/0078739 A1      Mar. 16, 2023

(30) Foreign Application Priority Data

Jan. 12, 2020   (CN) .......................... 202010029037.2

(51) Int. Cl.
*G06F 9/50*      (2006.01)
(52) U.S. Cl.
CPC .................................. *G06F 9/5027* (2013.01)
(58) Field of Classification Search
None
See application file for complete search history.

(56) References Cited

U.S. PATENT DOCUMENTS 8,255,915 B1 *  8/2012  Blanding .............. G06F 9/5027
                                                         709/224
8,881,168 B2 * 11/2014  Bobroff ................... G06F 9/505
                                                         718/1

(Continued)

FOREIGN PATENT DOCUMENTS

CN          103034475 A     4/2013
CN          105550130 A     5/2016
(Continued)

OTHER PUBLICATIONS

Adhiraki et al.; "A Survey on Scheduling Strategies for Workflows in Cloud Environment and Emerging Trends"; Association for Computing Machinery; ACM Computing Surveys, vol. 52, No. 4, Article 68. Publication date: Aug. 2019; (Adhikari_2019.pdf; pp. 1-36) (Year: 2019).*

(Continued)

*Primary Examiner* — Hiren P Patel
(74) *Attorney, Agent, or Firm* — COOPER LEGAL GROUP, LLC

(57) ABSTRACT

Disclosed are a FAAS distributed computing method and apparatus. The method includes: decomposing a computation task into multiple steps with correlation and execution order, and constructing multiple mirror images and multiple method groups respectively; creating multiple dockers in a process and allocating hardware resources according to the mirror image corresponding to a specific step; transferring, according to a dynamic pointer of the corresponding method group, a data processing result to the method group corresponding to the next step, and simultaneously storing a generated intermediate result in a distributed memory file system; modifying dynamic pointers of the multiple method groups in real-time to dynamically adjust the correlation and execution order of the multiple steps; monitoring a running state of each method in the multiple method groups, restart- (Continued)

ing the docker of the method or loading latest docker snapshot of the method and expanding or reducing a capacity of the method groups.

20 Claims, 2 Drawing Sheets

(56) References Cited

U.S. PATENT DOCUMENTS

| | | | |
|---|---|---|---|
| 9,104,456 B2* | 8/2015 | Pacheco | G06F 9/45533 |
| 9,772,878 B2* | 9/2017 | Sevigny | G06F 9/5044 |
| 9,860,569 B1* | 1/2018 | Wilms | H04N 21/23418 |
| 11,030,016 B2* | 6/2021 | Banerjee | G06F 9/5072 |
| 11,106,492 B2* | 8/2021 | Shanmugam | H04W 4/50 |
| 11,334,815 B1* | 5/2022 | Buehl | G06F 9/44505 |
| 11,341,179 B1* | 5/2022 | Brandwine | G06F 16/532 |
| 11,392,422 B1* | 7/2022 | Filiz | G06F 9/45558 |
| 11,573,816 B1* | 2/2023 | Featonby | H04L 67/10 |
| 2002/0184294 A1* | 12/2002 | Volkoff | G06Q 10/10 709/225 |
| 2017/0339203 A1 | 11/2017 | Kekre et al. | |
| 2018/0074855 A1* | 3/2018 | Kambatla | G06F 9/4881 |
| 2018/0173502 A1* | 6/2018 | Biskup | G06F 21/56 |
| 2018/0285156 A1* | 10/2018 | Corey | G06F 9/5005 |
| 2019/0065252 A1* | 2/2019 | San Miguel | G06F 9/4881 |
| 2019/0138555 A1* | 5/2019 | Bequet | H04L 67/10 |
| 2019/0220361 A1* | 7/2019 | Mageswaran | G06F 11/302 |
| 2019/0235906 A1* | 8/2019 | Asawa | G06F 11/3433 |
| 2019/0349447 A1* | 11/2019 | Adams | G06F 9/547 |
| 2020/0004575 A1 | 1/2020 | Bailey et al. | |
| 2020/0026732 A1* | 1/2020 | Bequet | G06F 16/164 |
| 2020/0117434 A1* | 4/2020 | Biskup | G06F 9/445 |
| 2021/0208934 A1* | 7/2021 | Jadhav | G06F 8/60 |
| 2021/0263779 A1* | 8/2021 | Haghighat | G06F 9/5061 |
| 2022/0188164 A1* | 6/2022 | Gerö | G06F 9/5077 |

FOREIGN PATENT DOCUMENTS

| | | |
|---|---|---|
| CN | 108616398 A | 10/2018 |
| CN | 110110520 A | 8/2019 |
| CN | 110442446 A | 11/2019 |
| CN | 110502340 A | 11/2019 |
| CN | 111209084 A | 5/2020 |

OTHER PUBLICATIONS

Rodriguez et al.; Scheduling dynamic workloads in multi-tenant scientific workflow as a service platforms; http://dx.doi.org/10.1016/j.future.2017.05.009; 2017 Elsevier B. V.; (Rodriguez_2017.pdf; pp. 739-750) (Year: 2017).*
International Search Report and English Translation cited in PCT/CN2020/111394 dated Dec. 2, 2020, 5 pages.
Written Opinion and English Translation cited in PCT/CN2020/111394 dated Dec. 2, 2020, 9 pages.

* cited by examiner

FAAS DISTRIBUTED COMPUTING METHOD AND APPARATUS

This application claims priority to Chinese Patent Application No. 202010029037.2, filed on Jan. 12, 2020, in China National Intellectual Property Administration and entitled "FAAS Distributed Computing Method and Apparatus", the contents of which are hereby incorporated by reference in its entirety.

FIELD

The present disclosure relates to the field of distributed computing, and more particularly to a Function As A Service (FAAS) distributed computing method and apparatus.

BACKGROUND

In a conventional memory computing system, after job submission, a flow diagram of data and a transformation process therein are fixed and cannot be modified in real-time. This is quite inconvenient for current business needs, and the architecture thereof is cumbersome and difficult to adjust.

For the problem in the prior art that a memory computing architecture is cumbersome and difficult to adjust, there is yet no effective solution currently.

SUMMARY

In view of this, an objective of embodiments of the present disclosure is to disclose a FAAS distributed computing method and apparatus, which may reduce the scale of monitoring failure and recovery, dynamically adjust data flow, and achieve extremely high scalability and flexibility.

Based on the above objective, a first aspect of the embodiments of the present disclosure provides a FAAS distributed computing method, including the following steps:

decomposing a computation task into multiple steps with correlation and execution order, and constructing multiple container images and multiple method groups in one-to-one correspondence with the multiple steps respectively;

in response to a need of executing a specific step, creating multiple containers in a process and allocating hardware resources according to the container image corresponding to the specific step, and simultaneously adding, as multiple methods, the created multiple containers to the method group corresponding to the specific step;

in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read;

in response to changing of the computation task, modifying dynamic pointers of the multiple method groups in real-time so as to dynamically adjust the correlation and execution order of the multiple steps;

monitoring a running state of each method in the multiple method groups by use of a container orchestrating tool, and in response to a running error or no response of the method, restarting the container of the method or loading a latest container snapshot of the method;

monitoring a resource occupation condition of each method in the multiple method groups by use of the container orchestrating tool, and in response to an excessively high or low average resource occupation of the methods in a certain method group, expanding or reducing a capacity of the method group.

In some implementation modes, the method further includes: in response to reception of data processing tasks by the method group, polling the methods in the method group in a load-balancing manner to execute the corresponding tasks, or allocating the data processing tasks with message digest to the same method. Hardware resources occupied by the multiple methods are provided by different hardware devices in a distributed system respectively.

In some implementation modes, the container orchestrating tool is configured to generate a corresponding monitoring module when each method is generated, and monitor, through the monitoring module, whether the method has a running error, whether the container fails to respond, and the resource occupation condition. The container orchestrating tool is further configured to, when each method is disabled, destroy the corresponding monitoring module.

In some implementation modes, the data processing includes data batch processing and data flow processing.

The method further includes: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of the existing method.

In some implementation modes, the methods include stateful methods and stateless methods. In response to a running error or no response of the stateless method, the container of the method is restarted. In response to a running error or no response of the stateful method, a latest container snapshot of the method is loaded.

A second aspect of the embodiments of the present disclosure provides a FAAS distributed computing apparatus, including:

a processor; and a memory, having a program code executable by the processor stored thereon, which when executed, implement the following steps sequentially:

decomposing a computation task into multiple steps with correlation and execution order, and constructing multiple container images and multiple method groups in one-to-one correspondence with the multiple steps respectively;

in response to a need of executing a specific step, creating multiple containers in a process and allocating hardware resources according to the container image corresponding to the specific step, and simultaneously adding, as multiple methods, the created multiple containers to the method group corresponding to the specific step;

in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read;

in response to changing of the computation task, modifying dynamic pointers of the multiple method groups in real-time so as to dynamically adjust the correlation and execution order of the multiple steps;

monitoring a running state of each method in the multiple method groups by use of a container orchestrating tool, and in response to a running error or no response of the method, restarting the container of the method or loading a latest container snapshot of the method;

monitoring a resource occupation condition of each method in the multiple method groups by use of the container orchestrating tool, and in response to an excessively high or low average resource occupation of the methods in a certain method group, expanding or reducing a capacity of the method group.

In some implementation modes, the steps further include: in response to reception of data processing tasks by the method group, polling the methods in the method group in a load-balancing manner to execute the corresponding tasks, or allocating the data processing tasks with message digest to the same method. Hardware resources occupied by the multiple methods are provided by different hardware devices in a distributed system respectively.

In some implementation modes, the container orchestrating tool is configured to generate a corresponding monitoring module when each method is generated, and monitor, through the monitoring module, whether the method has a running error, whether the container fails to respond, and the resource occupation condition. The container orchestrating tool is further configured to, when each method is disabled, destroy the corresponding monitoring module.

In some implementation modes, the data processing includes data batch processing and data flow processing.

The steps further include: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of the existing method.

In some implementation modes, the method includes stateful methods and stateless methods.

The steps further include: in response to a running error or no response of the stateless method, the container of the method is restarted. In response to a running error or no response of the stateful method, a latest container snapshot of the method is loaded.

The present disclosure has the following beneficial technical effects. According to the FAAS distributed computing method and apparatus, the technical scheme of decomposing a computation task into multiple steps with correlation and execution order, and constructing multiple container images and multiple method groups in one-to-one correspondence with the multiple steps respectively; in response to a need of executing a specific step, creating multiple containers in a process and allocating hardware resources according to the container image corresponding to the specific step, and simultaneously adding, as multiple methods, the created multiple containers to the method group corresponding to the specific step; in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read; in response to changing of the computation task, modifying dynamic pointers of the multiple method groups in real-time so as to dynamically adjust the correlation and execution order of the multiple steps; monitoring a running state of each method in the multiple method groups by use of a container orchestrating tool, and in response to a running error or no response of the method, restarting the container of the method or loading a latest container snapshot of the method; monitoring a resource occupation condition of each method in the multiple method groups by use of the container orchestrating tool, and in response to an excessively high or low average resource occupation of the methods in a certain method group, expanding or reducing a capacity of the method group can reduce the scale of monitoring failure and recovery, dynamically adjust data flows, and achieve extremely high scalability and flexibility.

BRIEF DESCRIPTION OF THE DRAWINGS

In order to more clearly illustrate the technical solutions in the embodiments of the present invention or the prior art, the drawings needing to be used in the description of the embodiments or the prior art will be briefly introduced below. It is obvious that the drawings in the following description are merely some embodiments of the present invention, and a person of ordinary skill in the art may also obtain other drawings according to these drawings without involving any inventive effort.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first", "second", etc., in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Figure 1:
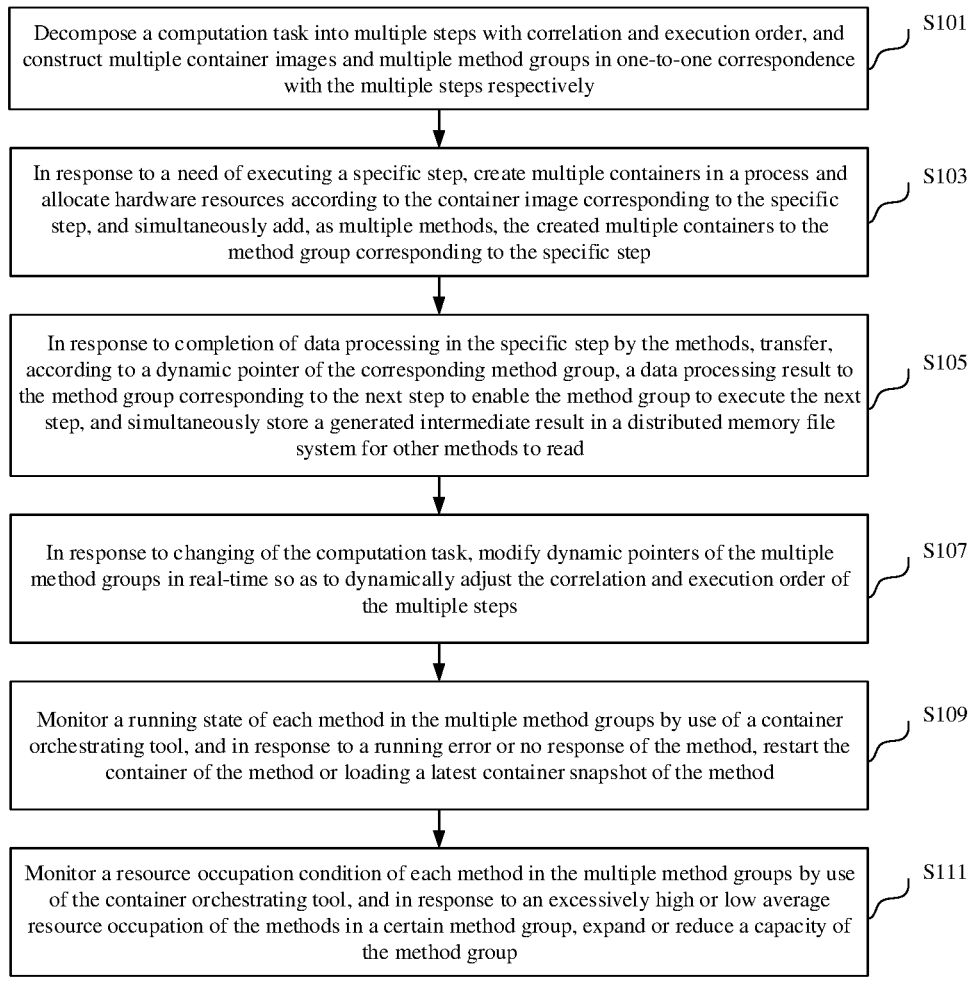
FIG. 1 is a schematic flowchart of a FAAS distributed computing method according to the present disclosure.

Based on the above objective, a first aspect of the embodiments of the present disclosure discloses an embodiment of a FAAS distributed computing method, which may reduce the scale of monitoring failure and recovery, dynamically adjust data flows, and achieve extremely high scalability and flexibility. FIG. 1 is a schematic flowchart of a FAAS distributed computing method according to the present disclosure.

As shown in FIG. 1, the FAAS distributed computing method includes the following steps.

Step S101: decompose a computation task into multiple steps with correlation and execution order, and construct multiple container images and multiple method groups in one-to-one correspondence with the multiple steps respectively.

Step S103: in response to a need of executing a specific step, create multiple containers in a process and allocate hardware resources according to the container image corresponding to the specific step, and simultaneously add, as multiple methods, the created multiple containers to the method group corresponding to the specific step.

Step S105: in response to completion of data processing in the specific step by the methods, transfer, according to a dynamic pointer of the corresponding method group, a data processing result to the method group corresponding to the next step to enable the method group to execute the next step, and simultaneously store a generated intermediate result in a distributed memory file system for other methods to read.

Step S107: in response to changing of the computation task, modify dynamic pointers of the multiple method groups in real-time so as to dynamically adjust the correlation and execution order of the multiple steps.

Step S109: monitor a running state of each method in the multiple method groups by use of a container orchestrating tool, and in response to a running error or no response of the method, restart the container of the method or loading a latest container snapshot of the method.

Step S111: monitor a resource occupation condition of each method in the multiple method groups by use of the container orchestrating tool, and in response to an excessively high or low average resource occupation of the methods in a certain method group, expand or reduce a capacity of the method group.

In the present disclosure, the concept of FAAS is utilized to decouple each transformation step in a data flow diagram in conventional memory computing into multiple transformation methods. These methods run in different processes, and are deployed by a container technology in a unified manner. Multiple running instances of the same method form a method group corresponding to a processing step in the data flow diagram, and each method group stores a pointer pointing to a downstream method group. Based on such a structure, a data flow may be determined. The pointer needs to be modified dynamically according to a business need, so the flow diagram is modifiable in real-time. The same method group may include one or more methods. The number of the methods in the group may be increased or decreased to dynamically adjust computing power and throughput of a specific step in the flow diagram. These method containers are managed in a unified manner by a container orchestrating tool Kubernetes. Kubernetes is responsible for maintaining the number of each method container in a cluster and monitoring a health condition.

In the present disclosure, a monitoring system monitors data processing pressure of each step in the flow diagram, and if the pressure of part of the steps is excessive, may perform a capacity expansion operation automatically. Otherwise, if detecting part of the methods are idle in most time, the system may disable these methods to release occupied resources. Intermediate computing results may be generated in many computing steps. These intermediate results are stored in a distributed memory file system. Compared with a disk-based distributed file system, a memory-based file system may implement data exchange faster. Data needed to be broadcast globally is stored in a distributed memory database. Globally broadcast data has the characteristics of small data volume, few write steps but many read steps, so storing in the memory database may increase the retrieval speed greatly. In the present disclosure, a container snapshot technology is also used to periodically store checkpoints of the containers. In case of a crash, the process may be terminated immediately, and the container is restarted and recovered with a snapshot stored before.

Those skilled in the art will appreciate that all or part of the processes in the methods of the above-mentioned embodiments can be completed by instructing relevant hardware through computer-readable instructions or a program, and the computer-readable instructions or program may be stored in a computer-readable storage medium which, when executed, may cause a processor to perform the processes of the embodiments of the methods described above. The storage medium may be a magnetic disk, an optical disk, a Read-Only Memory (ROM), a Random Access Memory (RAM), etc. The embodiment of the computer program may have effects the same as or similar to those in any corresponding method embodiment.

In some implementation modes, the method further includes: in response to reception of data processing tasks by the method group, polling the methods in the method group in a load-balancing manner to execute the corresponding tasks, or allocating the data processing tasks with message digest to the same method. Hardware resources occupied by the multiple methods are provided by different hardware devices in a distributed system respectively.

In some implementation modes, the container orchestrating tool is configured to generate a corresponding monitoring module when each method is generated, and monitor, through the monitoring module, whether the method has a running error, whether the container fails to respond, and the resource occupation condition. The container orchestrating tool is further configured to, when each method is disabled, destroy the corresponding monitoring module.

In some implementation modes, the data processing includes data batch processing and data flow processing. The method further includes: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of the existing method.

In some implementation modes, the methods include stateful methods and stateless methods. In response to a running error or no response of the stateless method, the container of the method is restarted. In response to a running error or no response of the stateful method, a latest container snapshot of the method is loaded.

The method disclosed according to the embodiments of the present disclosure may also be implemented as a computer program executed by a Central Processing Unit (CPU). The computer program may be stored in a computer-readable storage medium. When the computer program is executed by the CPU, the functions defined in the method disclosed in the embodiments of the present disclosure are executed. The above method steps and system units may also be implemented by a controller and a computer-readable storage medium configured to store a computer program enabling the controller to implement the steps or functions of the units.

A specific implementation mode of the present disclosure will further be described below according to a specific embodiment shown in FIG. 2.

Figure 2:
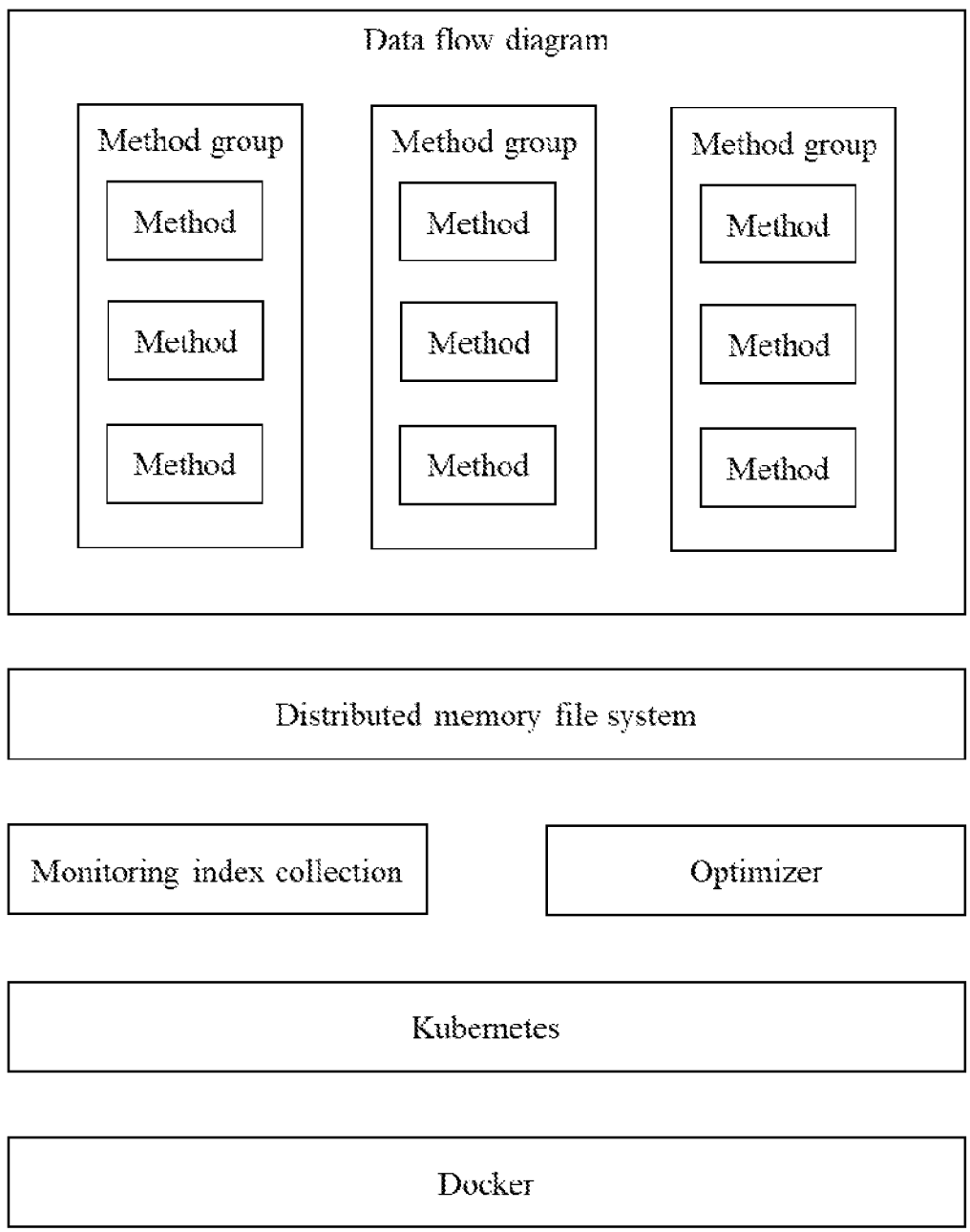
FIG. 2 is a schematic structural diagram of the FAAS distributed computing method according to the present disclosure.

As shown in FIG. 2, a data flow is formed by a data processing flow, i.e., multiple data processing steps and a connection relationship therebetween. In the present disclosure, each data processing step is a method group formed by multiple running instances of the same data transformation method. All methods in each method group are multiple running instances of the same processing logic (the same method) that run in different processes independently. The method examples in the same method group are distributed in each node of a cluster, whereby resources of each node are fully utilized, and the multiple methods in the group may be balanced in load and highly available. These methods run in a container environment. A container orchestrating tool Kubernetes is used to manage the health of method containers (whether they crash) and the number of running instances. The concept corresponding to method group in Kubernetes is service, so a unified call entry of these methods may be implemented by a Kubernetes network agent.

Intermediate results may be generated between the multiple data processing steps (method groups), so an intermediate data storage module is added between every two adjacent method groups in the system. In the present disclosure, the intermediate results are stored in a distributed memory file system. Data is distributed in each node of the cluster, and thus may be obtained rapidly by each method in the downstream method group. For a general method group, data, after being received at the unified entry, is sent to each method in the group by polling to implement load balancing. However, for a method corresponding to a data grouping step, data corresponding to the same grouping basis (referred to as a key of the data) is required to reach the same processing method in the downstream method group. In such case, a consistent hashing algorithm is needed. When the number of method instances in the method group corresponding to the data grouping step, data with the same key may still reach the same processing method.

Each method container is provided with a monitoring module (running in a pod of the same Kubernetes). The monitoring module is in one-to-one correspondence with the method container, and is created, destroyed, and migrated in the whole process along with the method container. The monitoring module is responsible for the following contents:

(1) whether the method has a running error and whether the method container is live;

(2) a resource occupation condition during running of the method, including CPU, memory, and network occupation conditions.

The index (1) is for failure recovery of the system. The index (2) is for dynamic capacity expansion/reduction of the system and optimization for different data processing scenarios.

First, for data batch processing, data is concentrated, and a data flow is from the upstream to the downstream. The system may run as many as method instances in each method group, thereby improving the parallelism and throughput of the system (resource waste caused by excessively low resource occupation of each method container in case of excessive running is avoided). In addition, only when data computing reaches a certain processing step in the diagram, a method group (including all method containers) corresponding to this step may be created for data processing in this step. Meanwhile, when the data processing of this step ends, these methods will not be used again in current batch data computing, so these method containers may be destroyed to release occupied resources. A method group corresponding to the next step may be created to start a subsequent computing flow.

Assuming that there are two data sources, the data sources are processed by data processing method groups 1 and 2 respectively. Then, a join operation is performed on two sets of data by use of a join method. Finally, a join result is processed by data processing method group 3, and an output result is stored in a data storage end. The execution flows and method groups are provided for the system to run after being constructed. The system creates containers of data processing method group 1 and data processing method group 2 first (a method corresponds to a container, and a group of methods correspond to a group of containers). The two groups of containers start running to read and process data of data source 1 and data source 2 respectively and simultaneously store computing results in the above-mentioned distributed memory file system. After method group 1 and method group 2 are executed, all the containers of the two method groups are destroyed, and containers corresponding to a join method group are started to read the intermediate results obtained in the previous step to start a join operation. Similarly, after the join operation ends, the corresponding containers are also destroyed, and the system creates containers of data processing method group 3 for execution. Finally, the containers of method group 3 are destroyed. Data is finally stored in the storage end. The execution process of the batch processing is ended.

Then, for data flow processing, data continuously enters the system from a data source. There is data being processed in each step of the data flow diagram at the same time, so the optimization mode of destroying processed steps in the batch processing is unavailable. It is necessary to dynamically adjust the throughput of each step according to the characteristic of the data flow. For different businesses or different time periods of the same business, data flows are different. There is a monitoring module in each method of the system, and method containers in each method group may be dynamically created and destroyed according to a data processing load, thereby meeting a business processing requirement in real-time with minimum resource consumption. It can be seen from the above description that, in the data flow processing scenario, the method groups for each step of the whole data flow are required to run at the same time (containers corresponding to the method group for each step are created when the data flow processing task is submitted). The optimization of the data flow processing is mainly reflected by capacity expansion and reduction of the method group (dynamically increasing and decreasing the number of the methods running in the method group).

For example, running instances of three method are started in a method group. If an excessive amount of data flows to the method group, resulting in an excessively high resource occupation of each method, the monitoring system, when timely finding this condition, may continuously start more method containers to enable new methods to share computing tasks until a resource occupation of each method container is reduced to a normal range. For example, the system creates two more method containers. In such a case, there are totally five methods running. Similarly, if the data inflow is relatively small in a certain period of time, resulting in a low load of each method in the method group, the system, when monitoring this condition, may terminate part of the method containers in the method group to reduce the number of methods running at the same time until the resource occupations of the method containers remaining running are increased to the normal range. It is finally to be noted that the optimization mode of capacity expansion and reduction of the method group is enabled not only in the data flow processing scenario. In the data batch processing scenario of the first part, if each method container in a certain method group is overloaded or underloaded, the system may also use the capacity expansion/reduction method to adjust the number of the methods in the method group to a reasonable range adapted to the business data volume.

In addition, the methods of the system are divided into two types: stateful and stateless methods. Computing logics of some methods are unrelated to data arriving before, such as a map operation. For such methods, running states need not to be stored, and if errors occur in running, it is only necessary to restart the method containers.

There is another type of stateful methods, such as a data source method that needs to store a specific data position (offset) reached in reading, or methods whose computing logics depend on previous and next data that is processed, such as a method of counting the processed data. These are all stateful methods. The stateful method needs a container snapshot for periodically storing the running state thereof, and when failing, may be recovered from the previous stored snapshot. Failure detection is implemented by a function of a liveness probe of Kubernetes. This probe periodically runs a command in the method container to detect whether the process of the method is abnormal, and also check whether a designated port (data inflow monitoring port) in the container is open. In these two manners, exceptions during running of the method container may be discovered at the first time, and recovery measures may be taken timely.

It can be seen from the above-mentioned embodiment that, according to the FAAS distributed computing method, the technical scheme of decomposing a computation task into multiple steps with correlation and execution order, and constructing multiple container images and multiple method groups in one-to-one correspondence with the multiple steps respectively; in response to a need of executing a specific step, creating multiple containers in a process and allocating hardware resources according to the container image corresponding to the specific step, and simultaneously adding, as multiple methods, the created multiple containers to the method group corresponding to the specific step; in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read; in response to changing of the computation task, modifying dynamic pointers of the multiple method groups in real-time so as to dynamically adjust the correlation and execution order of the multiple steps; monitoring a running state of each method in the multiple method groups by use of a container orchestrating tool, and in response to a running error or no response of the method, restarting the container of the method or loading a latest container snapshot of the method; monitoring a resource occupation condition of each method in the multiple method groups by use of the container orchestrating tool, and in response to an excessively high or low average resource occupation of the methods in a certain method group, expanding or reducing a capacity of the method group can reduce the scale of monitoring failure and recovery, dynamically adjust data flows, and achieve extremely high scalability and flexibility.

It is to be particularly pointed out that the steps in each embodiment of the FAAS distributed computing method may be mutually intersected, replaced, added, and deleted. Therefore, these reasonable permutations, combinations, and transformations about the FAAS distributed computing method shall also fall within the scope of protection of the present disclosure, and the scope of protection of the present disclosure should not be limited to the embodiments.

Based on the above objective, a second aspect of the embodiments of the present disclosure disclose an embodiment of a FAAS distributed computing apparatus, which may reduce the failure monitoring and recovery scale, dynamically adjust data flows, and achieve extremely high scalability and flexibility. The FAAS distributed computing apparatus includes:
  a processor; and
  a memory, having a program code executable by the processor stored thereon, which when executed, implement the following steps sequentially:
  decomposing a computation task into multiple steps with correlation and execution order, and constructing multiple container images and multiple method groups in one-to-one correspondence with the multiple steps respectively;
  in response to a need of executing a specific step, creating multiple containers in a process and allocating hardware resources according to the container image corresponding to the specific step, and simultaneously adding, as multiple methods, the created multiple containers to the method group corresponding to the specific step;
  in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read;
  in response to changing of the computation task, modifying dynamic pointers of the multiple method groups in real-time so as to dynamically adjust the correlation and execution order of the multiple steps;
  monitoring a running state of each method in the multiple method groups by use of a container orchestrating tool, and in response to a running error or no response of the method, restarting the container of the method or loading a latest container snapshot of the method;
  monitoring a resource occupation condition of each method in the multiple method groups by use of the container orchestrating tool, and in response to an excessively high or low average resource occupation of the methods in a certain method group, expanding or reducing a capacity of the method group.

In some implementation modes, the steps further include: in response to reception of data processing tasks by the method group, polling the methods in the method group in a load-balancing manner to execute the corresponding tasks, or allocating the data processing tasks with message digest to the same method. Hardware resources occupied by the multiple methods are provided by different hardware devices in a distributed system respectively.

In some implementation modes, the container orchestrating tool is configured to generate a corresponding monitoring module when each method is generated, and monitor, through the monitoring module, whether the method has a running error, whether the container fails to respond, and the resource occupation condition. The container orchestrating tool is further configured to, when each method is disabled, destroy the corresponding monitoring module.

In some implementation modes, the data processing includes data batch processing and data flow processing. The steps further include: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of the existing method.

In some implementation modes, the methods include stateful methods and stateless methods. The steps further include: in response to a running error of a stateless method or no response, restarting the container of the method; and in response to a running error of a stateful method or no response, loading a latest container snapshot of the method.

It can be seen from the above-mentioned embodiment that, according to the FAAS distributed computing apparatus, the technical scheme of decomposing a computation task into multiple steps with correlation and execution order, and constructing multiple container images and multiple method groups in one-to-one correspondence with the multiple steps respectively; in response to a need of executing a specific step, creating multiple containers in a process and allocating hardware resources according to the container image corresponding to the specific step, and simultaneously adding, as multiple methods, the created multiple containers to the method group corresponding to the specific step; in response to completion of data processing in the specific step by the methods, transferring, according to a dynamic pointer of the corresponding method group, a data processing result to the method group corresponding to the next step to enable the method group to execute the next step, and simultaneously storing a generated intermediate result in a distributed memory file system for other methods to read; in response to changing of the computation task, modifying dynamic pointers of the multiple method groups in real-time so as to dynamically adjust the correlation and execution order of the multiple steps; monitoring a running state of each method in the multiple method groups by use of a container orchestrating tool, and in response to a running error or no response of the method, restarting the container of the method or loading a latest container snapshot of the method; monitoring a resource occupation condition of each method in the multiple method groups by use of the container orchestrating tool, and in response to an excessively high or low average resource occupation of the methods in a certain method group, expanding or reducing a capacity of the method group can reduce the scale of monitoring failure and recovery, dynamically adjust data flows, and achieve extremely high scalability and flexibility.

It is to be particularly pointed out that a working process of each module is specifically described in the embodiment of the FAAS distributed computing apparatus with the embodiment of the FAAS distributed computing method, and application of these modules to other embodiments of the FAAS distributed computing method is apparent to those skilled in the art. Certainly, since the steps in the embodiment of the FAAS distributed computing method may be mutually intersected, replaced, added, and deleted, these reasonable permutations, combinations, and transformations about the FAAS distributed computing apparatus shall also fall within the scope of protection of the present disclosure, and the scope of protection of the present disclosure should not be limited to the embodiments.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A Function As A Service (FAAS) distributed computing method, comprising:

decomposing a computation task into a plurality of steps with correlation and execution order, and constructing a plurality of container images and a plurality of method groups in one-to-one correspondence with the plurality of steps respectively;

in response to a need of executing a specific step of the plurality of steps, creating a plurality of containers in a process and allocating hardware resources according to a container image of the plurality of container images corresponding to the specific step, and simultaneously adding, as a running environment of a plurality of methods, the plurality of containers to a method group of the plurality of method groups corresponding to the specific step;

in response to completion of data processing in the specific step by the plurality of methods, transferring, according to a dynamic pointer of the method group corresponding to the specific step, a data processing result to a method group of the plurality of method groups corresponding to a next step to enable the method group corresponding to the next step to execute the next step, and simultaneously storing a generated intermediate result in a distributed memory file system for other methods to read;

in response to changing of the computation task, modifying dynamic pointers of the plurality of method groups in real-time so as to dynamically adjust the correlation and execution order of the plurality of steps;

monitoring a running state of each method in the plurality of method groups by use of a container orchestration tool, and in response to a running error or no response of a method, restarting a container of the method or loading a latest container snapshot of the method;

monitoring a resource occupation condition of each method in the plurality of method groups by use of the container orchestration tool, and in response to an average resource occupation of methods in a certain method group being above a preset normal range or below the preset normal range, expanding or reducing a capacity of the certain method group; and in response to reception of data processing tasks by the method group, allocating the data processing tasks with identical message digest to a same method.

2. The method according to claim 1,
wherein hardware resources occupied by the plurality of methods are provided by different hardware devices in a distributed system respectively.

3. The method according to claim 1, wherein the container orchestration tool is configured to generate a corresponding monitoring module when each method in the plurality of method groups is generated, and monitor, through the corresponding monitoring module, whether the method has the running error, whether the container fails to respond, and the resource occupation condition, wherein the container orchestration tool is further configured to, when each method is disabled, destroy the corresponding monitoring module.

4. The method according to claim 1, wherein the data processing comprises a data batch processing and a data flow processing;
the method further comprises: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of existing method.

5. The method according to claim 4, wherein the data flow processing is formed by a plurality of data processing steps and a connection relationship therebetween.

6. The method according to claim 5, wherein each of the plurality of data processing steps is a method group formed by a plurality of running instances of a same data transformation method.

7. The method according to claim 6, wherein all methods in each method group are a plurality of running instances of a same method that run in different processes independently.

8. The method according to claim 5, wherein intermediate results are generated between the plurality of data processing steps, which are stored in the distributed memory file system.

9. The method according to claim 1, wherein the method comprises stateful methods and stateless methods; in response to a running error of a stateless method or no response, the container of the method is restarted; and in response to a running error or no response of a stateful method, a latest container snapshot of the method is loaded.

10. The method according to claim 1, wherein checkpoints of the containers are periodically stored to restart and recover the containers with a snapshot stored before.

11. A Function As A Service (FAAS) distributed computing apparatus, comprising:
a memory, storing a computer program; and
a processor, configured to execute the computer program, the computer program is configured to cause the processor to perform operations comprising:
decomposing a computation task into a plurality of steps with correlation and execution order, and constructing a plurality of container images and a plurality of method groups in one-to-one correspondence with the plurality of steps respectively;
in response to a need of executing a specific step of the plurality of steps, creating a plurality of containers in a process and allocating hardware resources according to a container image of the plurality of container images corresponding to the specific step, and simultaneously adding, as a running environment of a plurality of methods, the plurality of containers to a method group of the plurality of method groups corresponding to the specific step;
in response to completion of data processing in the specific step by the plurality of methods, transferring, according to a dynamic pointer of the method group corresponding to the specific step, a data processing result to a method group of the plurality of method groups corresponding to a next step to enable the method group corresponding to the next step to execute the next step, and simultaneously storing a generated intermediate result in a distributed memory file system for other methods to read;
in response to changing of the computation task, modifying dynamic pointers of the plurality of method groups in real-time so as to dynamically adjust the correlation and execution order of the plurality of steps;
monitoring a running state of each method in the plurality of method groups by use of a container orchestration tool, and in response to a running error or no response of a method, restarting a container of the method or loading a latest container snapshot of the method;
monitoring a resource occupation condition of each method in the plurality of method groups by use of the container orchestration tool, and in response to an average resource occupation of methods in a certain method group being above a preset normal range or below the preset normal range, expanding or reducing a capacity of the certain method group; and
in response to reception of data processing tasks by the method group, allocating the data processing tasks with identical message digest to a same method.

12. The apparatus according to claim 11, wherein hardware resources occupied by the plurality of methods are provided by different hardware devices in a distributed system respectively.

13. The apparatus according to claim 11, wherein the container orchestration tool is configured to generate a corresponding monitoring module when each method in the plurality of method groups is generated, and monitor, through the corresponding monitoring module, whether the method has the running error, whether the container fails to respond, and the resource occupation condition, wherein the container orchestration tool is further configured to, when each method is disabled, destroy the corresponding monitoring module.

14. The apparatus according to claim 11, wherein the data processing comprises a data batch processing and a data flow processing;
the computer program is configured to cause the processor to perform operations further comprising: in response to completion of a task of a specific step of the data batch processing by the method group, directly disabling the containers of all the methods in the method group; and in response to continuous processing of a task of a specific step of the data flow processing by the method group, according to the resource occupation condition in the method group, selectively dynamically enabling a container of a new method or disabling the container of existing method.

15. The apparatus according to claim 14, wherein the data flow processing is formed by a plurality of data processing steps and a connection relationship therebetween.

16. The apparatus according to claim 15, wherein each of the plurality of data processing steps is a method group formed by a plurality of running instances of a same data transformation method.

17. The apparatus according to claim 16, wherein all methods in each method group are the plurality of running instances of a same method that run in different processes independently.

18. The apparatus according to claim 15, wherein intermediate results are generated between the plurality of data processing steps, which are stored in the distributed memory file system.

19. The apparatus according to claim 14, wherein checkpoints of the containers are periodically stored to restart and recover the containers with a snapshot stored before.

20. The apparatus according to claim 11, wherein the methods comprise stateful methods and stateless methods;
   the computer program is configured to cause the processor to perform operations further comprising: in response to a running error of a stateless method or no response, restarting the container of the method, and in response to a running error or no response of a stateful method, loading a latest container snapshot of the method.

* * * * *